US012551388B2

(12) United States Patent
Boretto et al.

(10) Patent No.: US 12,551,388 B2
(45) Date of Patent: Feb. 17, 2026

(54) ROTATABLE SWING ARM STABILIZER ASSEMBLY FOR FOLDING WHEELCHAIRS

(71) Applicant: Spinergy, Inc., Carlsbad, CA (US)

(72) Inventors: Tod Douglas Boretto, San Marcos, CA (US); Martin Connolly, San Marcos, CA (US)

(73) Assignee: SPINERGY, INC

( * ) Notice: Subject to any disclaimer, the term of this patent is extended or adjusted under 35 U.S.C. 154(b) by 0 days.

(21) Appl. No.: 18/420,580

(22) Filed: Jan. 23, 2024

(65) Prior Publication Data

US 2024/0315898 A1 Sep. 26, 2024

Related U.S. Application Data

(63) Continuation of application No. 17/361,734, filed on Jun. 29, 2021, now Pat. No. 11,877,964, which is a continuation of application No. 16/556,076, filed on Aug. 29, 2019, now Pat. No. 11,045,367, which is a continuation of application No. 15/644,568, filed on Jul. 7, 2017, now Pat. No. 10,420,686.

(51) Int. Cl.
*A61G 5/08* (2006.01)
*A61G 5/04* (2013.01)
*B60G 7/00* (2006.01)

(52) U.S. Cl.
CPC ............... *A61G 5/08* (2013.01); *A61G 5/047* (2013.01); *A61G 5/0816* (2016.11); *B60G 7/001* (2013.01)

(58) Field of Classification Search
CPC ........ A61G 5/08; A61G 5/047; A61G 5/0816; B60G 7/001
USPC ........................................................ 280/304.1
See application file for complete search history.

(56) References Cited

U.S. PATENT DOCUMENTS

| | | | | |
|---|---|---|---|---|
| 2,818,910 | A * | 1/1958 | Hawkins | A61G 5/10 297/45 |
| 4,595,212 | A | 6/1986 | Haury | |
| 4,690,364 | A | 9/1987 | Constantin | |
| 5,241,876 | A | 9/1993 | Mathis | |
| 5,497,926 | A | 3/1996 | Rittenhouse | |
| 5,568,933 | A | 10/1996 | Mitzuno | |
| 5,651,422 | A | 7/1997 | Casali | |
| 5,915,709 | A | 6/1999 | Radjenovic et al. | |
| 6,182,992 | B1 * | 2/2001 | Garven, Jr. | A61G 5/1097 280/250.1 |
| 6,428,029 | B1 | 8/2002 | Barclay | |
| 6,474,916 | B2 | 11/2002 | Constantin | |
| 8,002,300 | B2 | 8/2011 | Ludovici et al. | |

(Continued)

*Primary Examiner* — Valentin Neacsu
*Assistant Examiner* — Felicia L. Brittman-Alabi
(74) *Attorney, Agent, or Firm* — Gary L. Eastman, Esq.; Eastman IP

(57) ABSTRACT

A swing arm assembly for a foldable wheelchair consisting of a camber tube and adapters is disclosed. The adapters mount to the frame of the wheelchair and receive the ends of the camber tube. Each end of the camber tube is pinned into an adapter using a quick release pin. The camber tube improves the stability of the foldable wheelchair. When desired to fold the wheelchair, the quick release pin is removed and the camber tube is removed, thereby allowing the wheelchair to fold. The adapters may be mounted to the wheelchair frame or to stub axles if used. The swing arm assembly adds substantial stiffness and stability to a folding wheelchair.

17 Claims, 15 Drawing Sheets

(56) References Cited

U.S. PATENT DOCUMENTS

| | | | |
|---|---|---|---|
| 8,684,113 | B1 | 4/2014 | Laconis |
| 2004/0021299 | A1 | 2/2004 | Tsai |
| 2006/0157953 | A1 | 7/2006 | Goertzen |
| 2009/0085321 | A1 | 4/2009 | Ludovici et al. |
| 2011/0101642 | A1 | 5/2011 | Chiu |
| 2013/0015632 | A1* | 1/2013 | Winter, V .............. A61G 5/128 280/244 |
| 2015/0137480 | A1 | 5/2015 | Dougherty |
| 2015/0283011 | A1 | 10/2015 | Hunt |

* cited by examiner

ROTATABLE SWING ARM STABILIZER ASSEMBLY FOR FOLDING WHEELCHAIRS

RELATED APPLICATIONS

This application is a continuation of U.S. Utility patent application Ser. No. 17/361,734 entitled "Rotatable Swing Arm Stabilizer Assembly for Folding Wheelchairs," filed Jun. 29, 2021 and currently co-pending, which is a continuation of U.S. Utility patent application Ser. No. 16/556,076 entitled "Rotatable Swing Arm Stabilizer Assembly for Folding Wheelchairs," filed Aug. 29, 2019, which is a continuation of U.S. Utility patent application Ser. No. 15/644,568 entitled "Rotatable Swing Arm Stabilizer Assembly for Folding Wheelchairs," filed on Jul. 7, 2017, which is a divisional of U.S. Utility patent application Ser. No. 15/063,440, entitled "Rotatable Swing Arm Stabilizer Assembly For Folding Wheelchairs," filed on Mar. 7, 2016, now U.S. Pat. No. 9,861,541, which claims the benefit of priority to U.S. Provisional Patent Application Ser. No. 62/128,952, entitled "Rotatable Swing Arm Assembly for Folding Wheelchair", filed on Mar. 5, 2015. Each of the aforementioned related applications is incorporated herein by reference.

FIELD OF THE INVENTION

The present invention pertains generally to accessories to folding wheelchairs and to provide structural stability to the wheelchair frame. The present invention is also useful to provide mounting points for securing the wheelchair in motor vehicles, to attach accessories to the wheelchair, and to provide a mounting location for mobility devices for use with foldable wheelchairs. More particularly, the present invention pertains to provide structural integrity to a foldable wheelchair and to mount accessories, such as a motor unit, to a foldable wheelchair. The Present invention is also useful as a way to power foldable wheelchairs using a quick attach and detach motor assembly.

BACKGROUND OF THE INVENTION

A wheelchair can be as simple as a chair with wheels attached to it or a complex as a chair having a computerized motor control system. A wheelchair allows a person to move around comparatively easy allowing them to maintain a dynamic and self-determined lifestyle. Various types of wheelchairs to meet a particular user's needs, such as the electric wheelchair, manual wheelchair, power wheelchair exist in the world today. They are generally a chair mounted on wheels, which moves either by a motor or by manually rotating the chair's wheels. Wheelchairs have provided a new level of freedom for people with disabilities by ensuring mobility to the people for whom walking is difficult or impossible. Over the years, inventors have developed many innovations in the wheelchair area to make the life of people with disabilities more convenient.

The first recorded use of self-propelled chairs by disabled people in Europe dates to the 17th century. In the early part of that century, German mechanic and inventor Johann Hautsch made several rolling chairs. In about 1655, disabled German watchmaker Stephan Farfler made a three-wheeled chair that he could propel by use of a rotary handle on the front wheel. So called mechanical "invalid chairs," later models of which employed a range of cranks and rotary devices, increased in use from the late 17th century. They were designed as a means of transport primarily for the wealthy. In the 18th century, wheelchairs began to appear in surgical and medical instrument catalogues, where they were advertised as transport vehicles for patients. Similar to armchairs in style, those wood, wicker, or iron machines, with large wheels at the front and one caster at the rear for balance, were ornate, heavy, and cumbersome.

Around 1750, English inventor James Heath introduced the Bath Chair, which was intended for use by women and invalids. The Bath Chair was a popular means of transport, particularly in Victorian Britain, where it served as a mode of transport for injured, sick, or disabled persons. The Bath Chair also served as a mode of transport for the wealthy. In the middle of the 19th century, designers introduced wheelchairs with wooden frames, seats, and backs made of cane. These wheelchairs were widely used in the United States by Civil War veterans. In the late 19th century, designers introduced other modifications such as wire-spoke wheels and rubber tires to reduce weight and increase comfort. Even with these developments, independent mobility with most wheelchairs remained limited to the confines of indoor environments.

Electric wheelchairs are one of the most popular types of motorized wheelchairs. These units typically consist of a center wheel and a rear wheel drive. It is the most maneuverable type of power wheelchair and can embody items like electric elevating seat and leg rests. The first wheelchairs were self-powered and worked when a patient manually turned the wheels of the chair. If patients were unable to operate the wheelchair, another person would have to push the wheelchair and patient from behind. A motorized wheelchair is one where a small motor drives one or more wheels. The earliest known attempts to create an electric wheelchair were made as far back as 1916, although no successful commercial production occurred at that time.

Following World War II, demand increased for motorized wheelchairs due to the high number of soldiers and sailors returning from combat after receiving serious physical injuries and amputations. Early electric wheelchairs were essentially standard wheelchairs with motors attached, which came to be known as power wheelchairs. Soon after, designers introduced power-base wheelchairs having the motor and batteries positioned beneath the seating component of the chair. By separating the drive component of the chair from the seating component, wheelchair designers broke new ground in wheelchair ergonomics. Other designs of motorized wheelchairs consist of an external motor unit mounted to the frame of a typical rigid wheelchair frame. Some designs have the motor unit attaching to the frame of the wheelchair. Other designs have the motor unit clamp to the main axle of the wheelchair.

One of the most-pivotal advances in wheelchair technology in the 20th century was the invention of the folding wheelchair, initially made with tubular steel, which allowed disabled individuals to use their wheelchairs outside their homes or care facilities. The early part of the 20th century saw the development of the first folding designs and tubular-steel chairs. In 1932, disabled mining engineer Herbert A. Everest and mechanical engineer Harry C. Jennings introduced the cross-frame wheelchair, which became the standard design for tubular-steel folding chairs.

Folding wheelchairs, while collapsible and easily transportable, often sacrifice stability or structural integrity in exchange for the collapsible functionality. The scissor-frame, or "X" design of most folding wheelchairs often result in a wheelchair that is less rigid when used than the fixed wheelchair.

Designers focused their subsequent developments primarily on decreasing weight and increasing reliability and performance. Many advances came from the use of wheelchairs in sports, which inspired the development of ultra-lightweight models. Modern designs included the Quickie, an ultra-lightweight rigid-frame wheelchair introduced in 1979. The Quickie wheelchair was unique for both its improved performance and its introduction of color and aesthetics.

Contemporary wheelchairs, especially motorized power ones, have been designed to ensure solutions for diversified requirements of diverse types of handicapped individuals. With a constant evolution taking place in the modern world, there is a parallel evolution taking place in the wheelchair area. A large number of individuals experience new disabilities every year because of health conditions, ailments, and accidents. Accordingly, these individuals suffer from traumatic changes in their lives such as the lessening of self-sufficiency and mobility. With the assistance of the motorized chair, one can overcome many of the challenges experienced by handicapped individuals.

For both manual and electric wheelchairs, the 20th century saw key improvements in seating design, which brought relief from problems such as pressure sores and added support for persons affected by conditions such as skeletal deformities. Together, advances in maneuverability, comfort, and reliability helped disabled persons to participate more fully in social and sporting activities.

While there have been new deigns attempting to create functional external motor units, current ones still fail to address the shortcomings of modern designs. For example, the New Electric Wheelchairs (NEWS) device designed by Ju Hyun Lee. NEWS is a motor unit designed to clamp around a wheelchair and attach to the outside of its wheels. A control console extends from one clamp, across the front of the occupant, to the other clamp. To attach NEWS, a wheelchair is push forward into NEWS where the clamps are attached to the outside of the wheels. The control console has controls and indicators for the user to operate the NEWS. Even through NEWS may be attached to a wheelchair, it suffers from other drawbacks. For instance, in modern society, buildings are designed to only meet the minimum spacing requirements promulgated by the government. Since NEWS clamps to the outside of the wheelchair's wheels, it adds to the overall width of the wheelchair. As such, use of NEWS can lead to the user being blocked from entering certain buildings and spaces. In addition, NEWS requires the use of a stand when removed from a wheelchair. If the stand is not available, a user may not be able to remove NEWS without the help of another able-bodied person.

Even with the wheelchair advances seen over the last century, there remain challenges for people in need of a wheelchair to function in everyday life. The advent of the collapsible wheelchair provided a substantial boost for the overall mobility of wheelchair users. Powered wheelchairs also provided a substantial boost. However, the industry lacks a collapsible wheelchair capable of receiving a motor unit easily installed and removed by a wheelchair user. The industry also lacks a solution to increase the rigidity of modern foldable wheelchairs.

SUMMARY OF THE INVENTION

The present invention consists of swing arm assembly installed onto a foldable wheelchair. When installed, a camber tube provides increased structural rigidity to the frame of the foldable wheelchair. The camber tube can also provide a secure mounting location for a vehicle mounting assembly, such as for use in securing a wheelchair within a motor vehicle, and can also serve to facilitate connection to an external motor unit. The camber tube is attached to the frame of the wheelchair in the area proximate the center of the wheels. Adapters are mounted onto the frame designed to receive the ends of the camber tube. One end of the camber tube attaches to one of the adapters using a pin or bolt to allow the camber arm to pivot. The other end of the camber tube attaches to the other adapter using a quick-release pin.

In use, the adapters connect to either the frame of the wheelchair or to the wheelchair's stub axles. The camber tube then attaches to the adapters. To allow the foldable wheelchair to fold when not in use, the user removes the quick-release pin from the camber tube thereby allowing the camber tube to rotate such that it is oriented approximately front to back instead of side-to-side between the wheels. With the camber tube moved to this position, the wheelchair can fold to its normal fully closed position. When the wheelchair is unfolded for use, the camber tube is rotated until the end of the tube aligns with the adapter where the quick-release pin is inserted to hold the camber tube in place. Positioning the camber tube between the wheels provides increased stability to the wheelchair frame and improves the structural integrity of the chair. Once the camber tube is secured in place, the structural integrity of the foldable wheelchair is improved and accessories can be added, such as a vehicle mounting bracket, or the wheel chair can be secured in a vehicle, or can be used to attach an external motor unit to the wheelchair.

An advantage of using a camber tube is the increased frame stability to the folding wheelchair. Another advantage is that once the camber tube is positioned and secured in place, it may be used to secure a wheelchair in position within a motor vehicle for use. Another advantage of using a camber tube with a foldable wheelchair allows a connected motor unit to move relative to the frame of the wheelchair. This relative movement allows for the drive wheel(s) of the motor unit to maintain contact with the ground, and therefore traction, when the wheelchair is traversing uneven ground. Another advantage is the use of the swing arm assembly with an external motor unit lowers the overall center of gravity of the wheelchair, thereby increasing ride stability.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
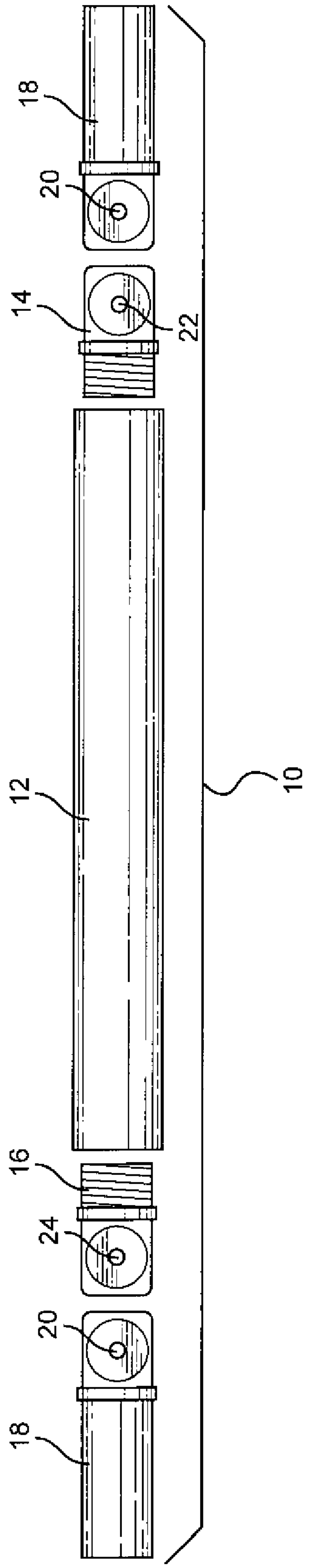
FIG. 1 is a perspective view of the swing arm assembly showing the individual parts comprising the assembly.

Referring initially to FIG. 1, a perspective view of the swing arm assembly is shown and generally referred to as 10. Swing arm assembly 10 consists of a camber tube 12, a first camber tube adapter 14, a second camber tube adapter 16, and two wheelchair adapters 18. Camber tube 12 can be formed from aluminum, plastic, or carbon fiber. Camber tube 12 may also be solid or hollow. Attached to a first end of camber tube 12 is a camber tube adapter 14. Camber tube adapter 14 has a pinhole 22. Attached to a second end of camber tube 12 is an second camber tube adapter 16, which has a pinhole 24. Also included in swing arm assembly 10 are wheelchair adapters 18 having pinholes 20. It is to be appreciated by someone skilled in the art that camber tube adapters 14 and 16 may be formed as an integral part of camber tube 12. It is to be further appreciated by someone skilled in the art that camber tube adapters 14 and 16 as well as wheel chair adapters 18 may be made from, but not exclusively, steel, aluminum, hard plastic, or composite materials such as carbon fiber.

Figure 2:
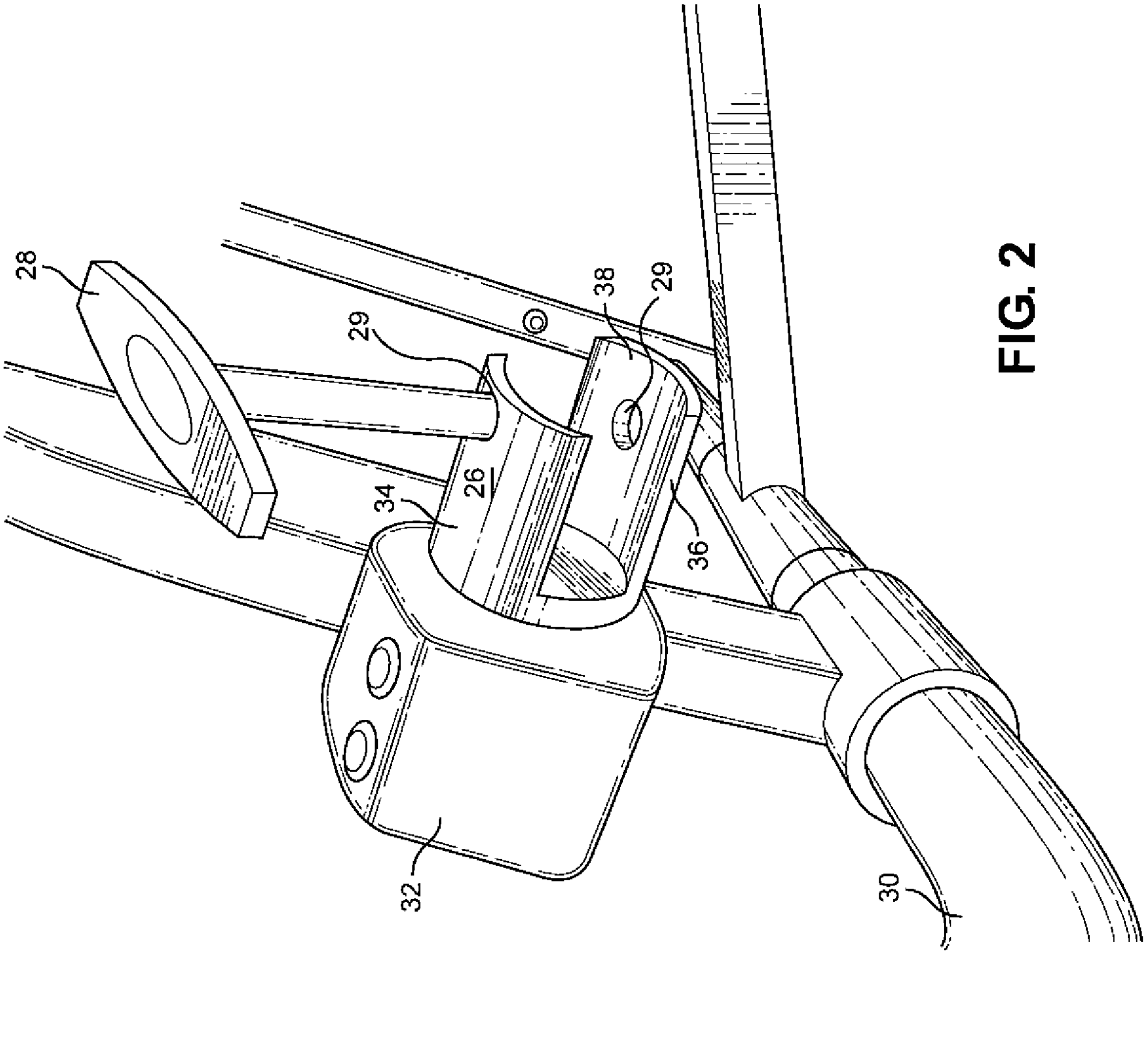
FIG. 2 is a close up view of a wheelchair adapter installed into a mounting bracket located on the frame of a wheelchair.

FIG. 2 is a close up view of an alternative wheel chair adapter 26 installed into mounting bracket 32 on wheelchair 30. Wheelchair adapter 26 consists of pinholes 29 formed in wheelchair adapter arms 34 and 36, coaxially aligned, and designed to receive pin 28. Pin 28 may be, but not limited to, a quick release pin, such as a quick release 'T' handle pin, a cotter pin, or a bolt. Slot 38 is formed between wheelchair adapter arms 34 and 35, and is sized to receive camber tube adapter 16. When camber tube adapter 16 is inserted into slot 38, pinhole 24 coaxially aligns with pinholes 29. Pinhole 24 is also designed to receive pin 28 such that camber tube adapter 16 is locked to wheelchair adapter 26 when pin 28 is inserted through pinholes 24 and 29.

Figure 3:
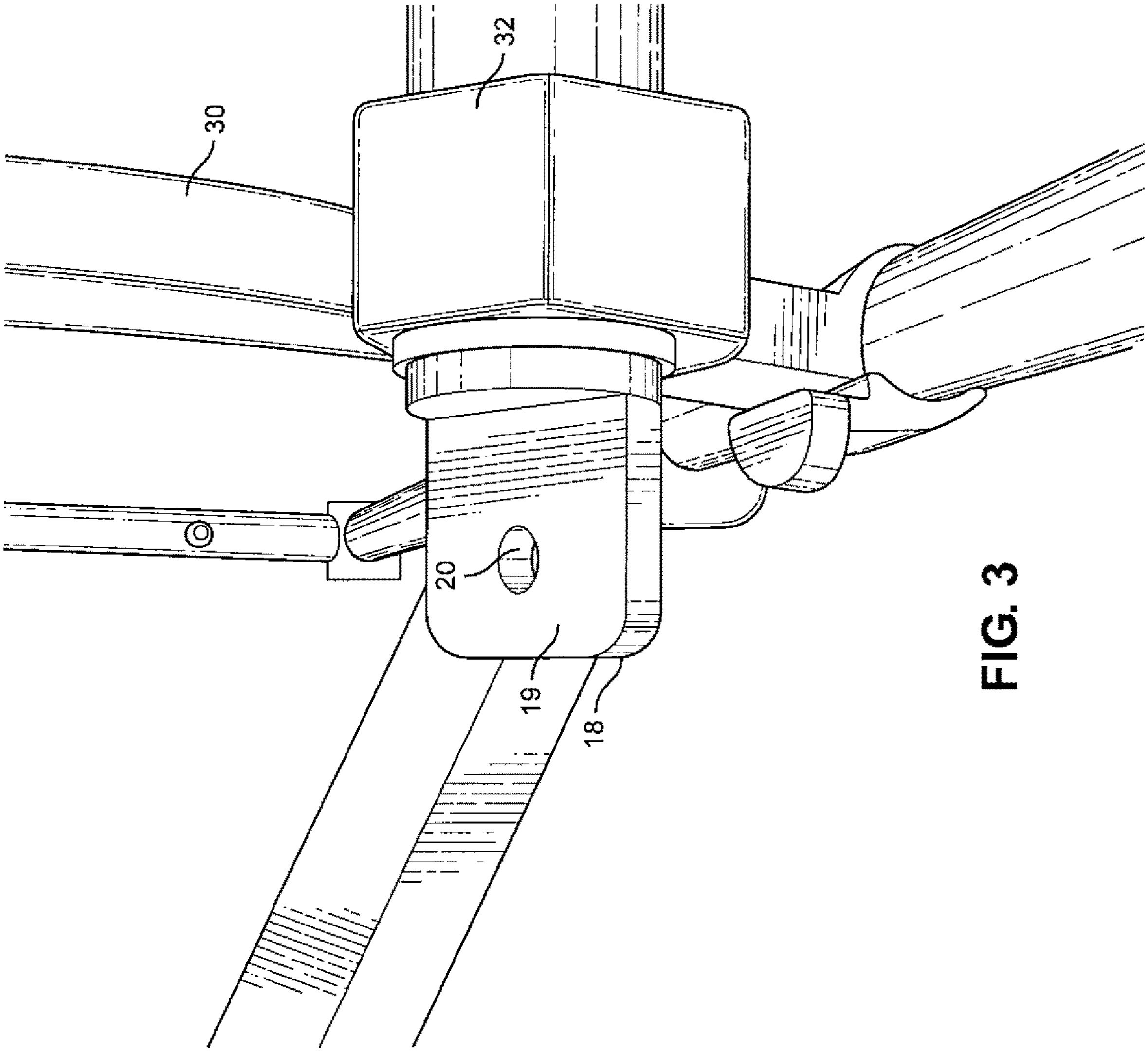
FIG. 3 is a close up view of a wheelchair adapter installed into a mounting bracket located on the frame of a wheelchair.

FIG. 3 is a close up view of wheelchair adapter 18. Wheelchair adapter 18 consists of one wheelchair adapter arm 19 having a flat face. Formed through the approximate center of wheelchair adapter arm 19 is Pinhole 20. Wheelchair adapter 18 mounts into mounting bracket 32 on wheelchair 30. In alternative embodiments, wheelchair adapters 18 mount to the wheelchair's 30 stub axles, if used. In yet more alternative embodiments, mounting bracket 32 may be integrated into the stub axles removing the need to use a separate mounting bracket.

Figure 4:
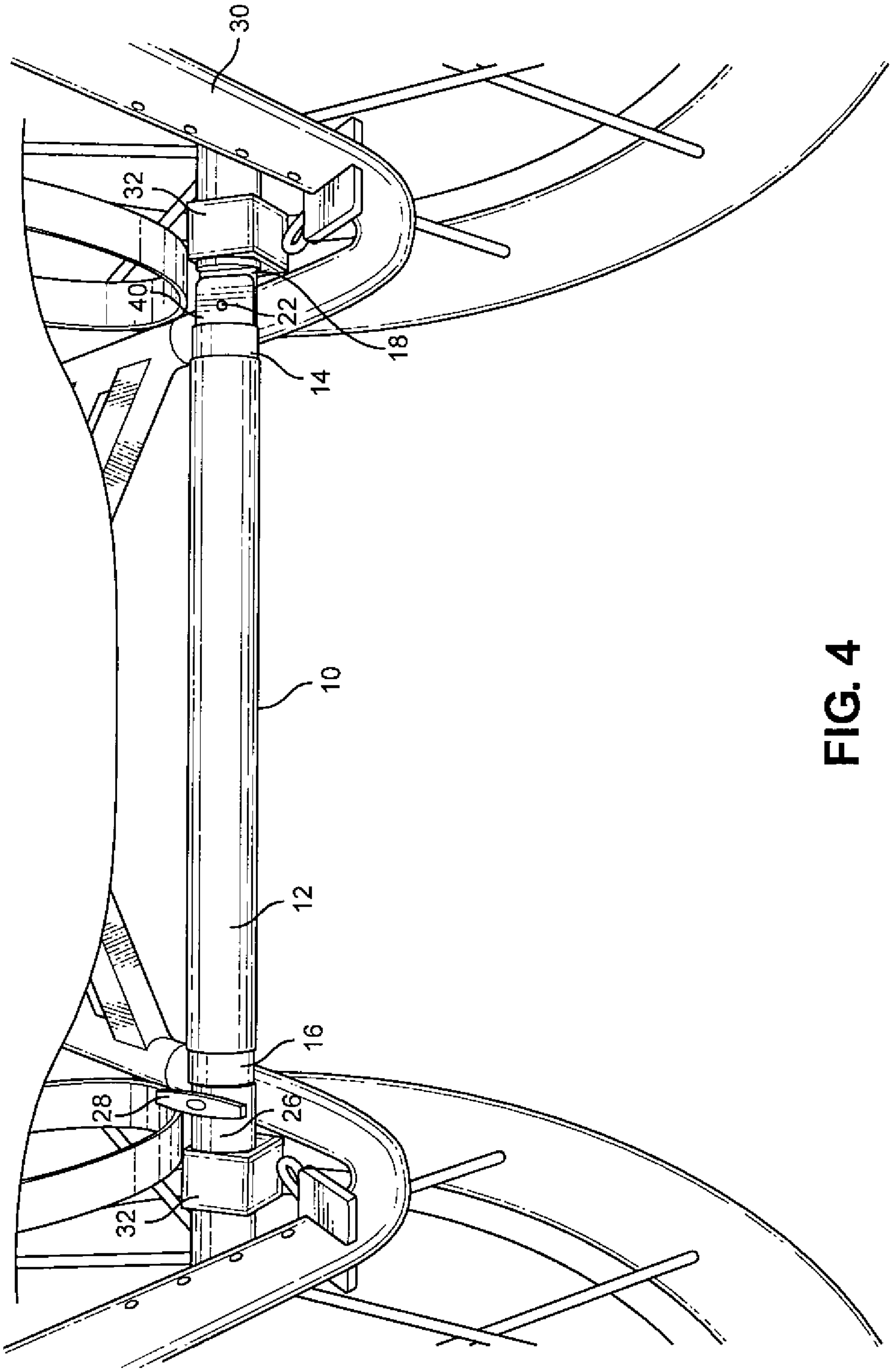
FIG. 4 is a perspective view of the swing arm assembly fully installed onto a wheelchair.

FIG. 4 is a perspective view of swing arm assembly 10 installed into mounting brackets 32 on wheelchair 30. Camber tube adapter 16 is installed into wheelchair adapter 26 and held in place with pin 28. Camber tube adapter 14 is installed into wheelchair adapter 18 and held in place with pin 40 inserted through pinhole 22. When swing arm assembly 10 is installed onto wheelchair 30, swing arm assembly 10 can be used for mounting an external motor unit (not shown) to wheelchair 30. It is to be appreciated by someone skilled in the art that the installation of swing arm assembly 10 adds significant stiffness to wheelchair 30. Since foldable wheelchairs are notoriously weak and flexible, the implementation of swing arm assembly 10 is a cheap and lightweight alternative to increasing a folding wheelchair's stiffness and stability while still allowing the wheelchair to fold to its fully folded position. It is also to be appreciated by someone skilled in the art that swing arm assembly 10 will maintain a fixed distance between the wheelchair's 30 wheels when the swing arm assembly 10 is attached to wheelchair adapters 18 and 26.

From FIG. 4 it can be appreciated that the additional of a transversely mounted structural member 10 to the otherwise "X" shaped wheelchair frame provides a measure of stability unmatched in folding wheelchairs. By fixing the distance between the wheels through the use of the present invention, the structural integrity and rigidity of the wheelchair is greatly improved.

Figure 5:
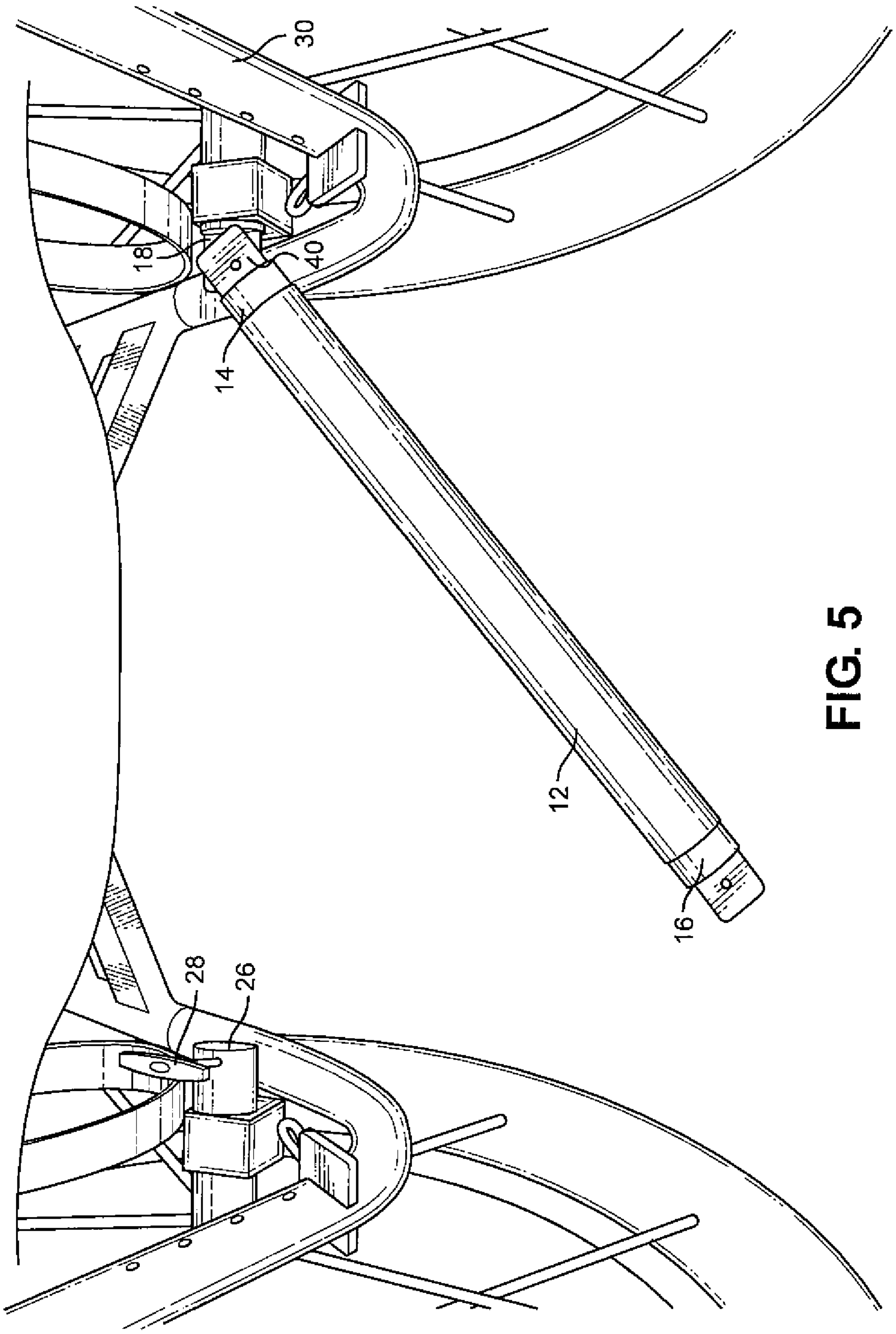
FIG. 5 is a perspective view of the camber tube disengaged from one of the wheelchair adapters and rotated such that the camber tube is oriented approximately front to back.

FIG. 5 is a perspective view of swing arm assembly 10 having camber tube 12 disengaged from wheelchair adapter 26 and rotated approximately 90 degrees such that camber tube 12 has a general front to back orientation. In operation, pin 28 is removed from wheelchair adapter 26 thereby allowing camber tube 12 to rotate about pin 40 inserted through camber tube adapter's 14 pin hole 20 and wheelchair adapter's 18 pinhole. When camber tube 12 is oriented in this position, wheelchair 30 may be folded into its fully folded position for transport or storage. When wheelchair is unfolded for use, camber tube 12 is rotated until camber tube adapter 16 is engaged with wheelchair adapter 26. Pin 28 is then inserted through camber tube adapter 16 and wheelchair adapter 26 to hold camber tube 12 in place during use.

The use of camber tube 12 provides for the easy adaptation of the wheelchair for a variety of uses. For instance, the use of camber tube 12 allows for the easy attachment of vehicle mounting assemblies in order to quickly and easily attach the wheelchair into position of a motor vehicle. Instead of having to use cumbersome cargo straps, by using the camber tube of the present invention, the wheelchair can be secured in position within the vehicle by attachment to the camber tube which is securely mounted to the wheelchair frame. Additionally, the camber tube can be used to securely mount other apparatus to the wheelchair, such as towable carts, medication-related devices including IV poles and air-gas canisters. Additionally, the camber tube can serve as an attachment point for power add on devices, such as those shown in FIGS. 6 through 8.

Figure 6:
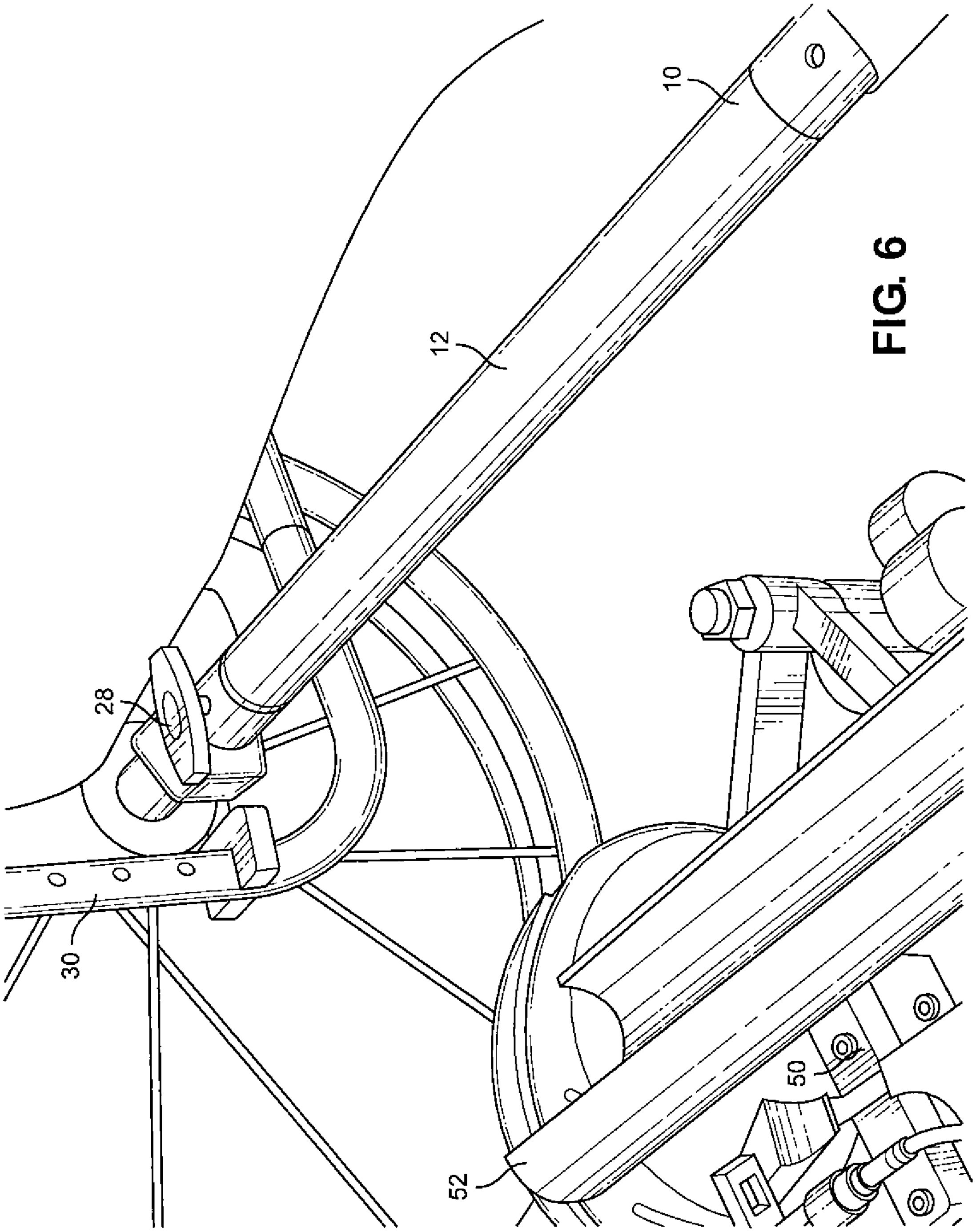
FIG. 6 is a side perspective view of the present invention showing a motor unit aligned for attachment to the swing arm assembly.

FIG. 6 is a side perspective view of the present invention showing a motor unit 50 aligned for attachment to swing arm assembly 10. Motor unit 50 consists of clamshell bracket 52 designed to clamp around camber tube 12. In operation, a wheelchair user maneuvers wheelchair 30 such that it backs up to motor unit 50 until clamshell bracket 52 comes into contact with camber tube 12. The width of motor unit 50 is such that it fits between the wheels of the wheelchair 30 and will help guide wheelchair 30 backwards such that it properly aligns with camber tube 12.

Figure 7:
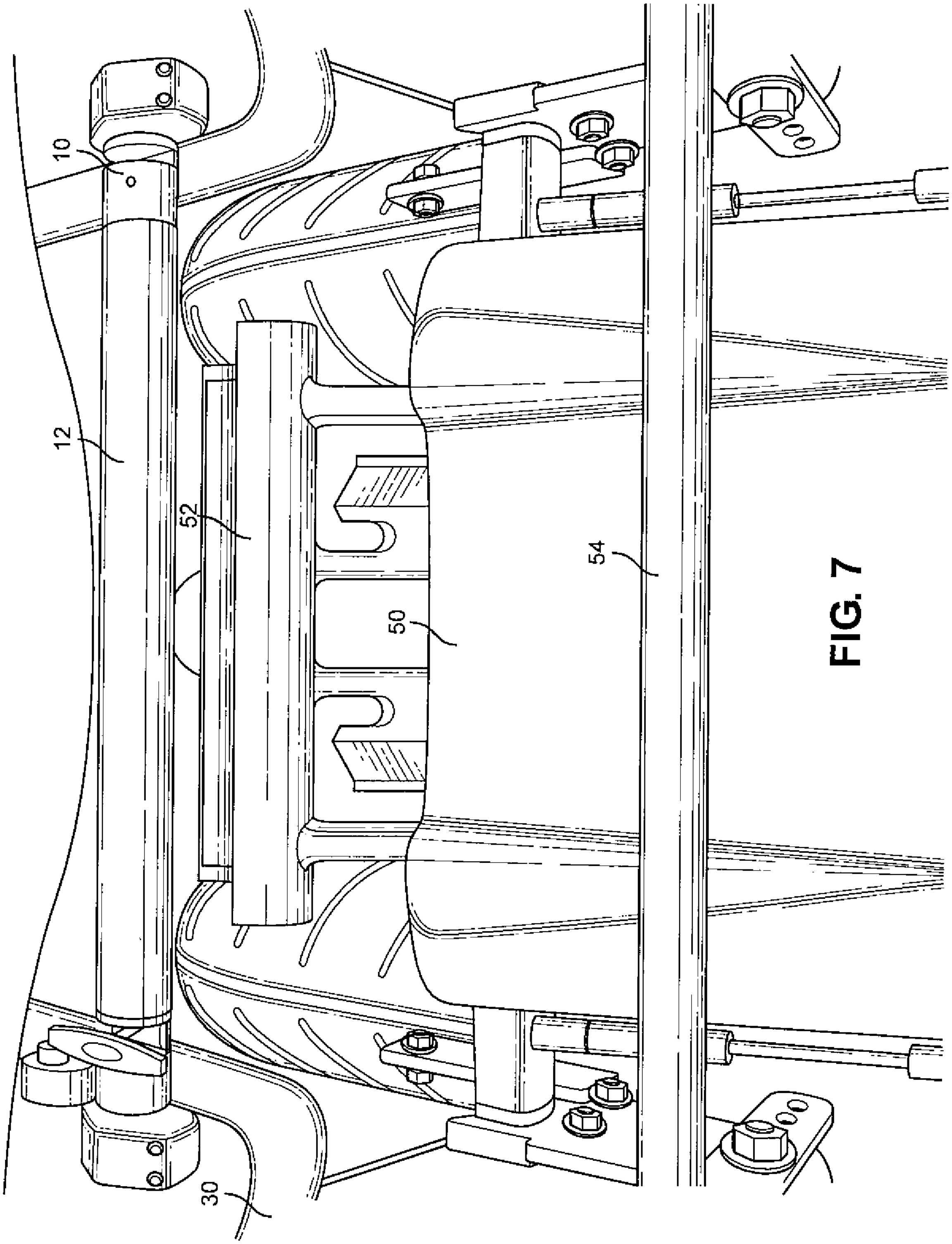
FIG. 7 is a rear perspective view of a motor unit closely aligned with the swing arm assembly just prior to the motor units mounting to the swing arm.

FIG. 7 is a rear perspective view of motor unit 50 closely aligned with swing arm assembly 12. Motor unit 50 and clamshell bracket 52 are designed such that they pass beneath wheelchair frame rail 54. Swing arm assembly 10 is also mounted such that it is below wheelchair frame rail 54 thereby allowing easy mounting and dismounting of motor unit 50 from wheelchair 30 simply by rolling wheelchair 30 forward or backward without the need to lift wheelchair 30 over motor unit 50.

Figure 8:
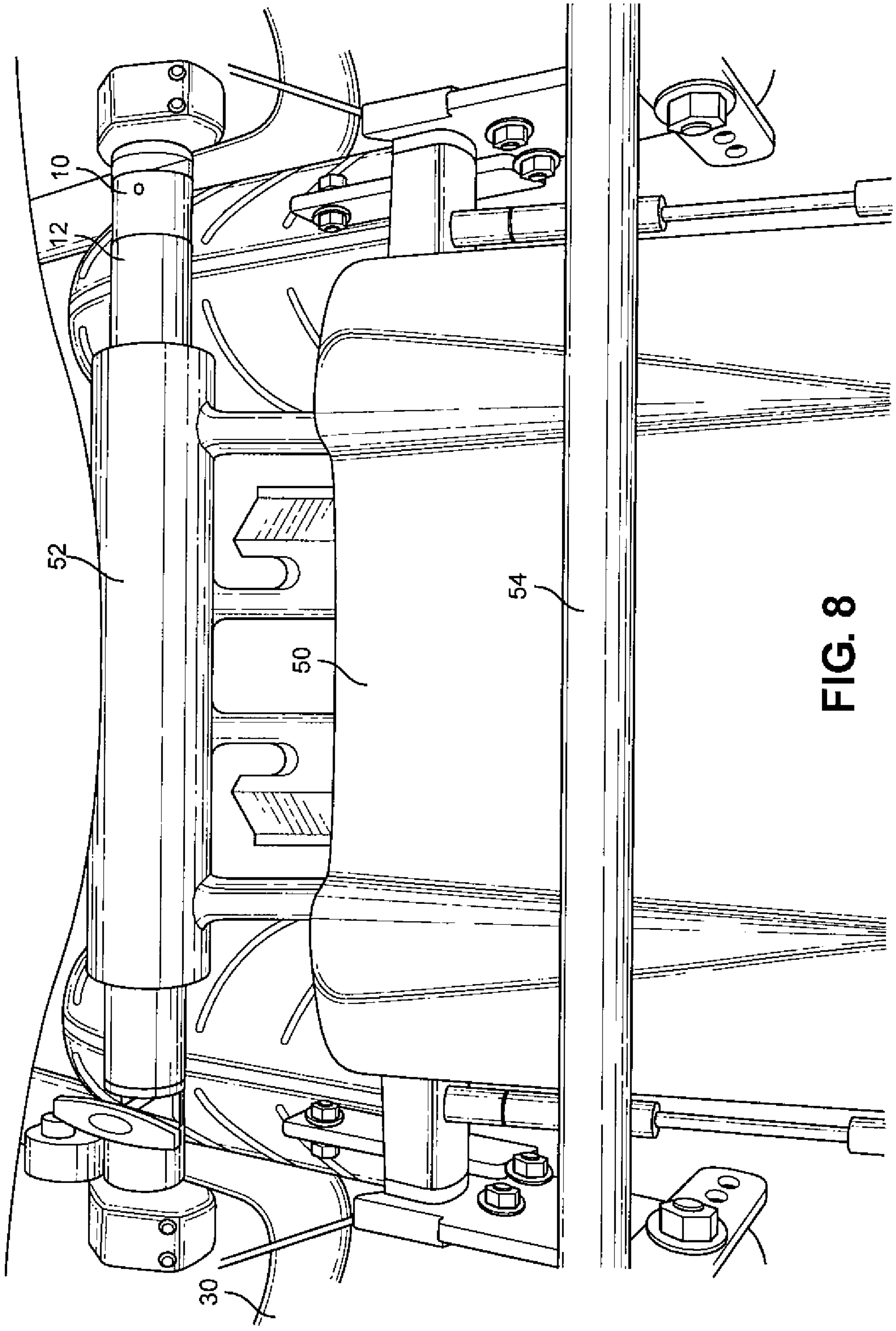
FIG. 8 is a rear perspective view of a motor unit mounted to the swing arm assembly.

FIG. 8 is a rear perspective view of motor unit 50 mounted to swing arm assembly 10. When wheelchair 30 is rolled backward enough such that clamshell bracket 52 comes into contact with camber tube 12, clamshell bracket 52 closes around camber tube 12 thereby mounting motor unit 50 to wheelchair 30. Clamshell bracket 52 is sized such that when closed around camber tube 12, clamshell bracket 52 and motor unit 50 can rotate up and down relative to wheelchair 30, thereby allowing motor unit 50 to maintain contact with the ground while traversing uneven terrain. For instance, if wheelchair 30 with motor unit 50 attached passes over a slight peak, when wheelchair 30 passes over the crest of the peak, it will attain a downward attitude. If motor unit 50 is rigidly mounted to wheelchair 30, the wheels of motor unit 50 will come off the ground when wheelchair 30 attains the downward attitude thereby removing locomotion from wheelchair 30. Motor unit 50 is designed such that it will maintain traction using its own weight.

Figure 9:
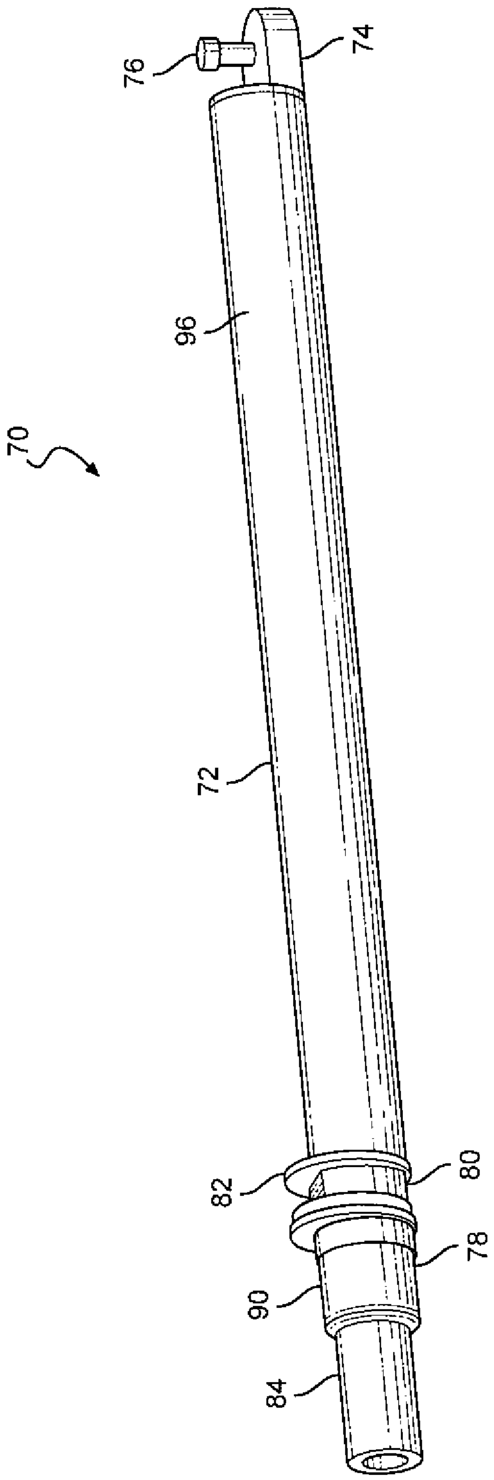
FIG. 9 is a perspective view of an alternative camber tube of the present invention.

Moving now to FIG. 9, a perspective view of an alternative camber tube assembly of the present invention is shown and generally designated 70. Camber tube assembly 70 consists of a camber tube 72 having a first camber tube adapter 74 attached at one end and a second camber tube adapter 78 attached at the other end. First camber tube adapter 74 has a pivot configured to rotatably attached to a wheelchair adapter (not shown) such that the camber tube 72 may rotate from a first position to a second position. In the first position, camber tube 72 engages wheelchair adapter 84, which defines an axis of rotation. In the second position, camber tube 72 is positioned perpendicular to the axis of rotation. When secured to wheelchair adapter 84, camber tube assembly 70 provides structural stiffness to a foldable wheelchair as well as a point to attach an external motor unit. Also shown in FIG. 9 is pinhole 90, which, when camber tube 72 is in the first position, aligns with pinhole 92 (not shown, see FIG. 13). A quick release pin 94 (not shown, see FIG. 15) may then be inserted through pinholes 90 and 92 thereby securing together camber tube assembly 70.

As with other embodiments of the present invention, wheelchair adapter 84 is configured to be secured to a frame member of a folding wheelchair. However, wheelchair adapter 84 may be integrally formed into the folding wheelchair, such as with a stub axle.

Figure 10:
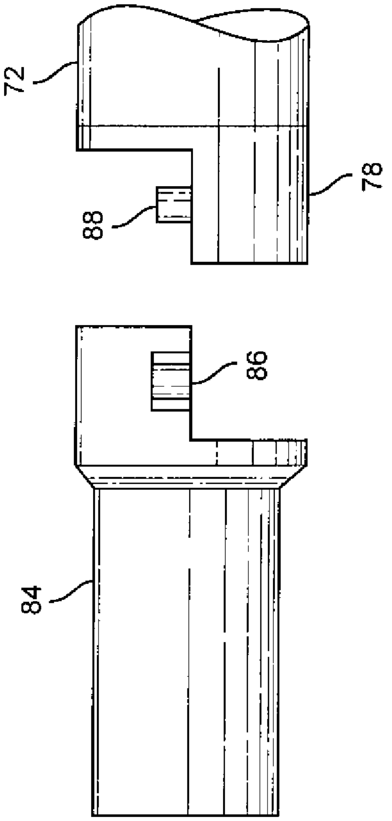
FIG. 10 is a side view of the alternative camber tube of FIG. 9 showing the wheel chair adapter, the camber tube adapter, the alignment pin, and the alignment pin slot.

Now looking at FIG. 10, a side view of the alternative camber tube of FIG. 9 is shown. Camber tube adapter 78 further comprises an alignment pin 88. Wheelchair adapter 84 further comprises an alignment pin slot 86, which is sized to receive alignment pin 88. When camber tube 72 is in the first position, alignment pin engages alignment pin slot 86, thereby preventing camber tube adapter 78 from pulling away from wheelchair adapter 84 in the direction of the axis of rotation 96. As shown in FIG. 10, alignment pin slot 86 is beveled so that alignment pin 88 does not have to be perfectly aligned with alignment pin slot 86 to engage camber tube adapter 78 with wheelchair adapter 84.

Figure 11:
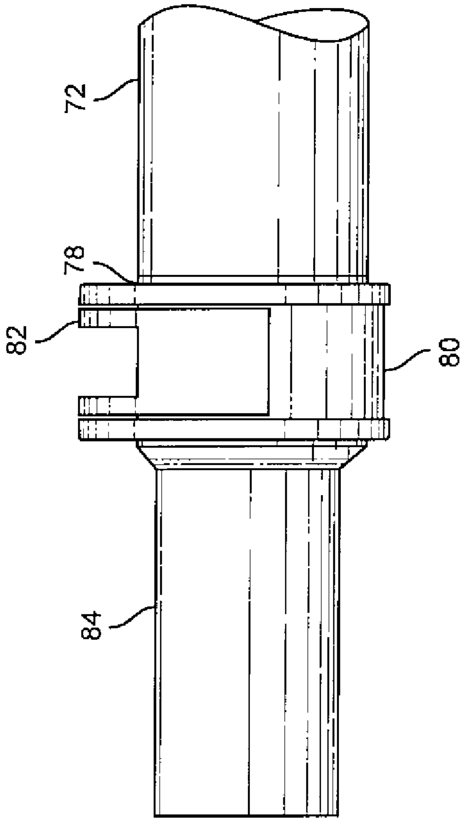
FIG. 11 is a side view of the alternative camber tube of FIG. 9 showing the clamp positioned such that it clamps the camber tube adapter and the wheelchair adapter together.

FIG. 11 is a side view of a portion of the alternative camber tube assembly 70 showing clamp 80 positioned over the interface between camber tube adapter 78 and wheelchair adapter 84. Clamp 80 has lever 82, which is configured to securely clamp the clamp 80 around the camber tube adapter 78 and the wheelchair adapter 84 such that they will not disengage during use. When lever 82 is in a first position, clamp 80 loosely fits around camber tube 72 and camber tube adapter 78. After positioning clamp 80 over camber tube adapter 78 and wheelchair adapter 84, lever 82 is moved to a second position, which causes clamp 80 to tightly fit around camber tube adapter 78 and wheelchair adapter 84 thereby securing camber tube adapter 78 to wheelchair adapter 84 for use.

Figure 12:
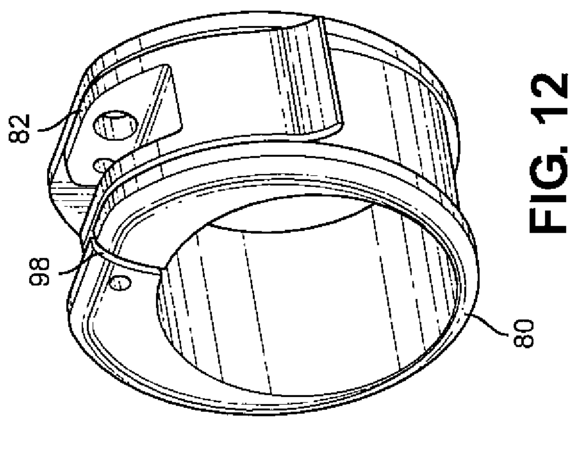
FIG. 12 is a perspective view of the clamp from FIG. 9.

FIG. 12 is a perspective view of clamp 80 having lever 82. As shown in FIG. 12, clamp 80 further comprises gap 98. Gap 98 works in conjunction with lever 82 by providing space for clamp 80 to become secured around camber tube adapter 78 and wheelchair adapter 84 when lever 82 is moved from its first position to its second position.

Figure 13:
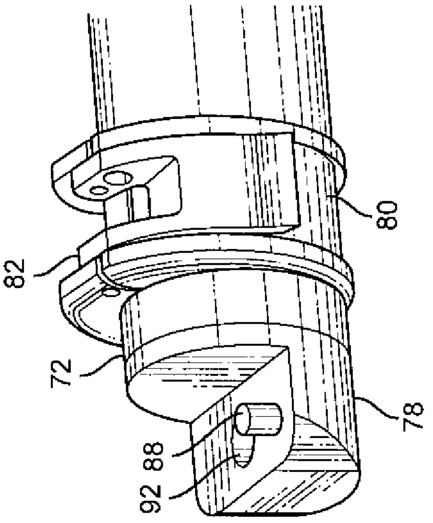
FIG. 13 is a perspective view of the camber tube adapter and collar from FIG. 9.

FIG. 13 is a perspective view of the camber tube 70, camber tube adapter 78, alignment pin 88, and clamp 80. As shown in FIG. 13, camber tube adapter 78 further comprises pinhole 92. As described in FIG. 9, pin hole 90 (not shown, see FIG. 9) aligns with pin hole 92 when alignment pin 88 is fully engaged with alignment pin slot 86 on wheelchair adapter 84. This alignment allows a quick release pin 94 (not shown, see FIG. 15) to be inserted through pin hole 90 and pin hole 92, thereby securing camber tube adapter 78 to wheelchair adapter 84. It is to be appreciated by someone skilled in the art that a user must use either clamp 80 or quick release pin 94 but not both since the use of one blocks the other. However, the use of either clamp 80 or quick release pin 94 results in the same secured engagement between camber tube adapter 78 and wheelchair adapter 84.

Figure 14:
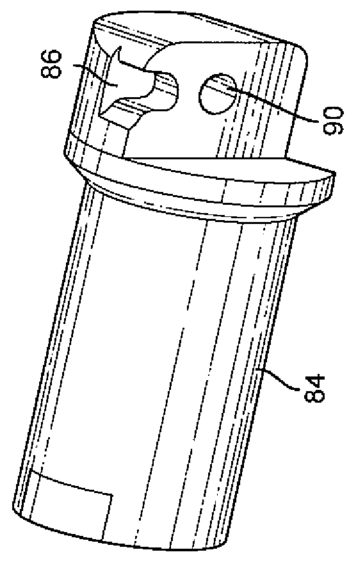
FIG. 14 is a perspective view of the wheelchair adapter from FIG. 9.

Moving now to FIG. 14, a perspective view of wheelchair adapter 84 is shown showing pin hole 90 and the beveled design of alignment pin slot 86. It is to be appreciated by someone skilled in the art that alignment pin slot 86 may be a straight slot, and not beveled as shown in FIG. 14, without departing from the scope and spirit of the present invention.

Figure 15:
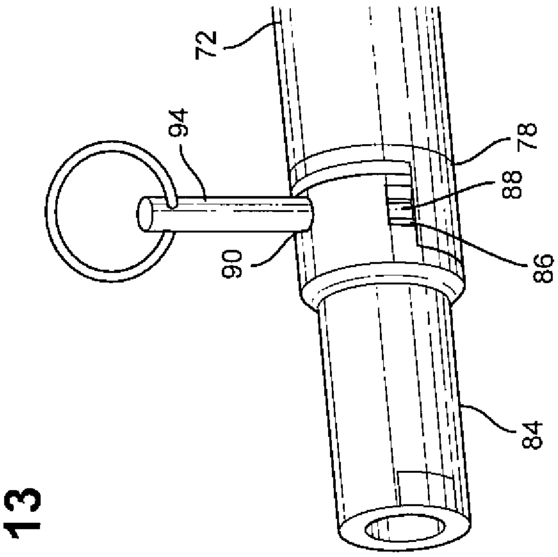
FIG. 15 is a perspective view of the alternative camber tube of FIG. 9 that utilizes a quick-release pin inserted through coaxial pin holes in the camber tube adapter and the wheelchair adapter.

FIG. 15 is a perspective view of the alternative camber tube 70. As can be seen from FIG. 15, inserted into pinhole 90 and pinhole 92 (not shown) is quick release pin 94. Also shown in FIG. 15 is a portion of alignment pin 88 and alignment pin slot 86. In use, quick release pin 94 is inserted into pinholes 90 and 92 when camber tube adapter 78 is fully engaged with wheelchair adapter 84. Quick release pin 94 prevents camber tube adapter 78 from separating from wheelchair adapter 84 during use. To store the folding wheelchair 30 (not shown), quick release pin 94 is pulled out of pinholes 90 and 92 thereby allowing camber tube 72 to rotate from the second position to the first position where folding wheelchair 30 (not shown) may then be folded for storage or transport.

Figure 16:
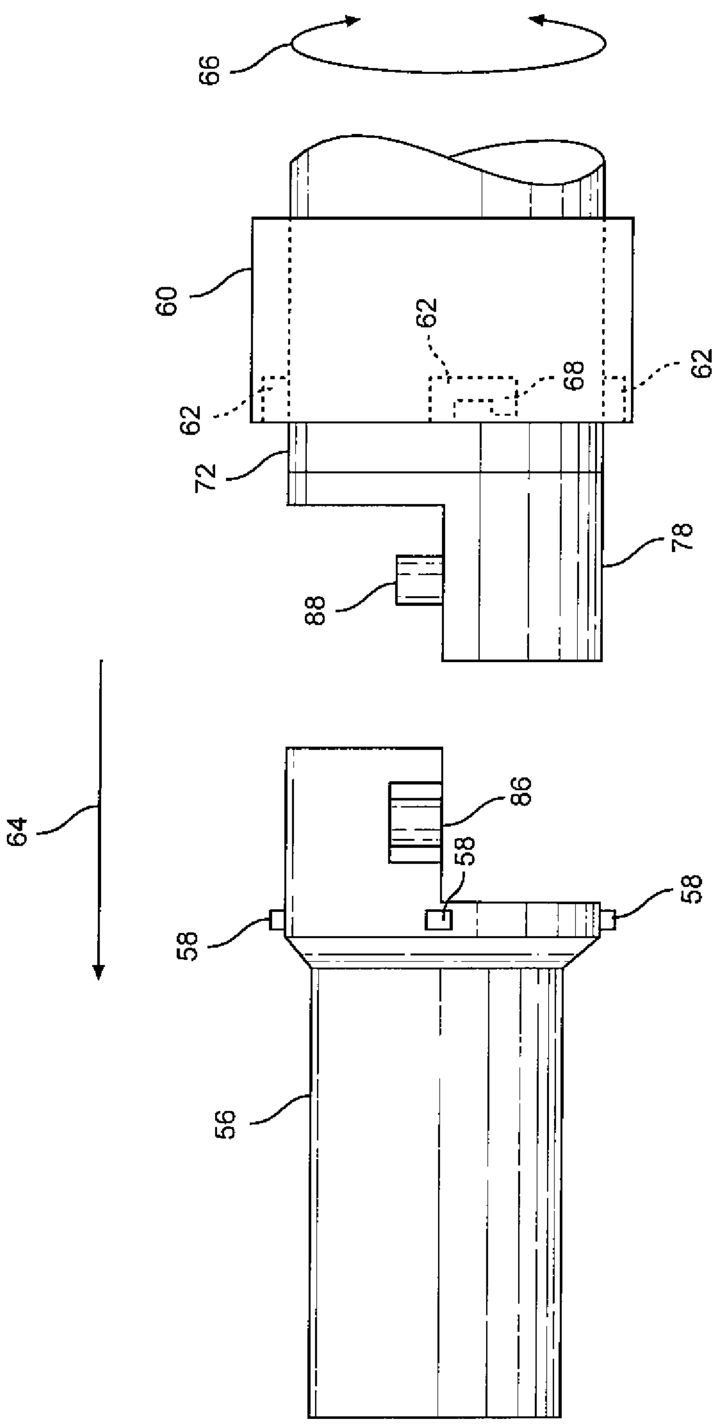
FIG. 16 is a side view of the alternative camber tube of FIG. 9 showing the positioning of the camber tube and a bayonet connection collar that secures the camber tube in position.

Referring now to FIG. 16, another alternative embodiment of the present invention is shown. Wheelchair adapter 56 comprises alignment pin slot 86 and engagement tabs 58. As shown in FIG. 16, four (4) engagement tabs 58 are located equidistant around the circumference of wheelchair adapter 56. However, it is to be appreciated by someone skilled in the art that two (2) or more engagement tabs 58 may be used with departing from the spirit and scope of the present invention. Also shown in FIG. 16 is locking collar 60. Locking collar 60 comprises engagement slots 62, which are oriented to match the layout of engagement tabs 58 on wheelchair adapter 56.

In use, after alignment pin 88 of camber tube adapter 72 is fully engaged with alignment pin slot 86 by moving camber tube 72 from its first position to its second position, locking collar 60 is moved in direction 64 until engagement tabs 58 engage engagement slots 82. After engagement, collar 60 is rotated in direction 66 until engagement pin 58 stops at the engagement slot end portion 68. The nature of engagement slot end portion 68 prevents collar from rotating opposite direction 66 thereby preventing unwanted disengagement of camber tube adapter 78 from wheelchair adapter 56 during use.

In other embodiments of the present invention, collar 60 may have pin holes (not shown) to allow the use of a quick release pin 94 in conjunction with locking collar 60. In use, after engaging locking collar 60 with wheelchair adapter 56, quick release pin 94 (not shown this figure) is inserted through locking collar 60, pin hole 90, and pin hole 92.

Figure 17:
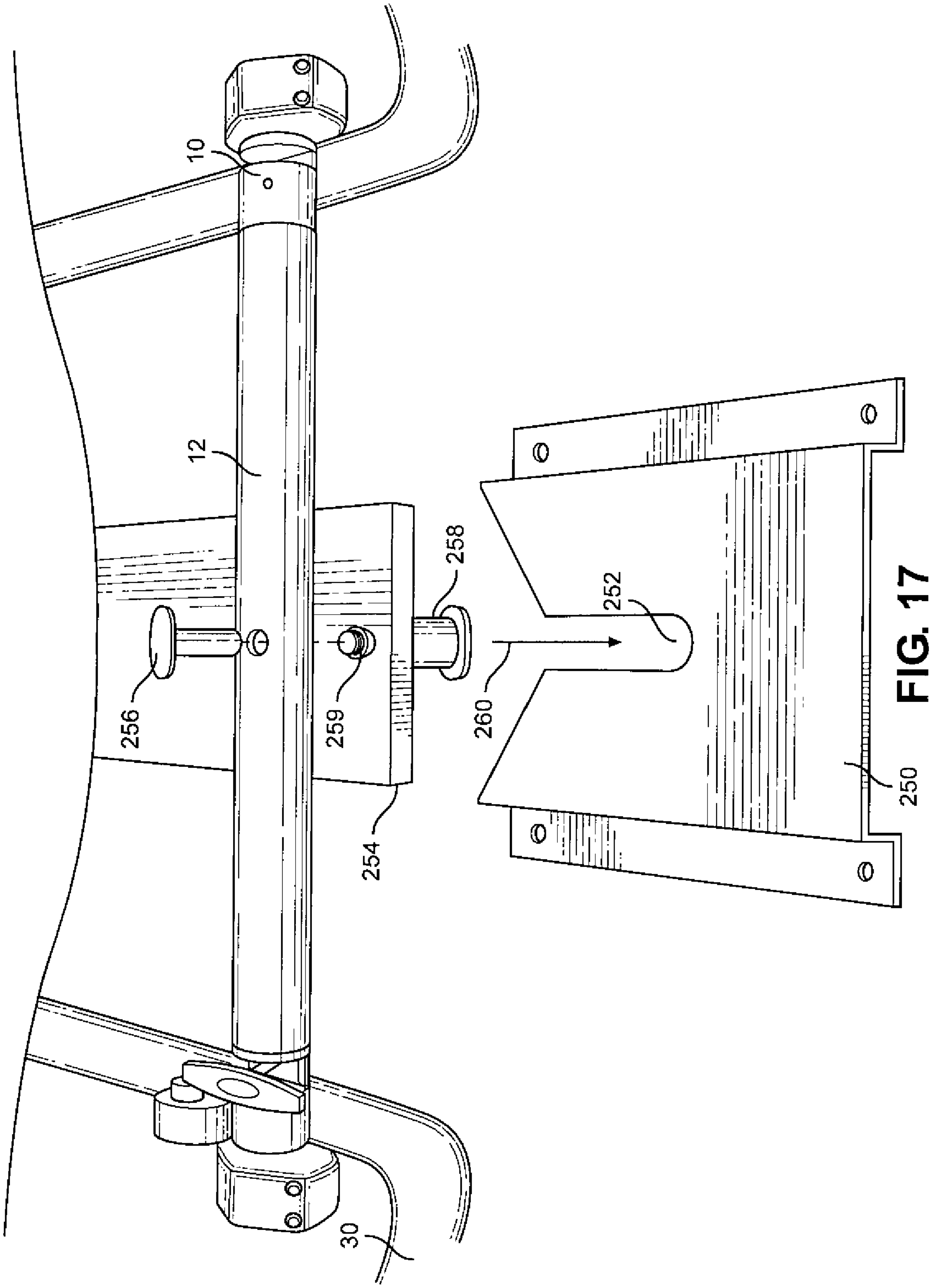
FIG. 17 is a rear perspective view of the camber tube of FIG. 9 equipped with a mounting bracket and pin for securing a foldable wheelchair into a vehicle mounting system.

Referring now to FIG. 17, another alternative embodiment of the present invention is shown. Wheelchair 30 is equipped with a camber tube 12 and is positioned adjacent a mounting bracket 250 known in the art for mounting a wheelchair in a motor vehicle. Bracket 250 includes a receiving slot 252 and size to receive pin 258 extending from plate 254 that is attached securely with t-pin 256 to camber tube 12. As is known in the art, a variety of methods of attachment of the plate 254 may be used without departing from the present invention. Pin 258 is shown as a threaded pin having a nut 259 to hold the pin 258 in place, however, other methods known in the art can be used. In use, wheelchair 30 is positioned such that pin 258 is aligned with slot 252 in bracket 250, and when wheelchair 30 is moved in direction 260, pin 258 engages slot 252 to secure the wheelchair in place. To remove plate 254 from camber tube 12, t-pin 256 may be removed, and the chair can be folded as described in detail above. Pin 258 may extend directly from camber tube 12 to bracket 250.

As described herein, an attachment mechanism can be referred to as any mechanical attachment device which interfaces with the camber tube. For instance, a power add-on unit may have an attachment device for connecting to the camber tube of a foldable wheelchair. Also, a vehicle mounting bracket may be considered an attachment mechanism as it attaches to the camber tube to secure the foldable wheelchair into a vehicle. Additionally, other attachment mechanisms may include air-gas accessories, such as mounting brackets for gas canisters, such as oxygen.

Figure 18:
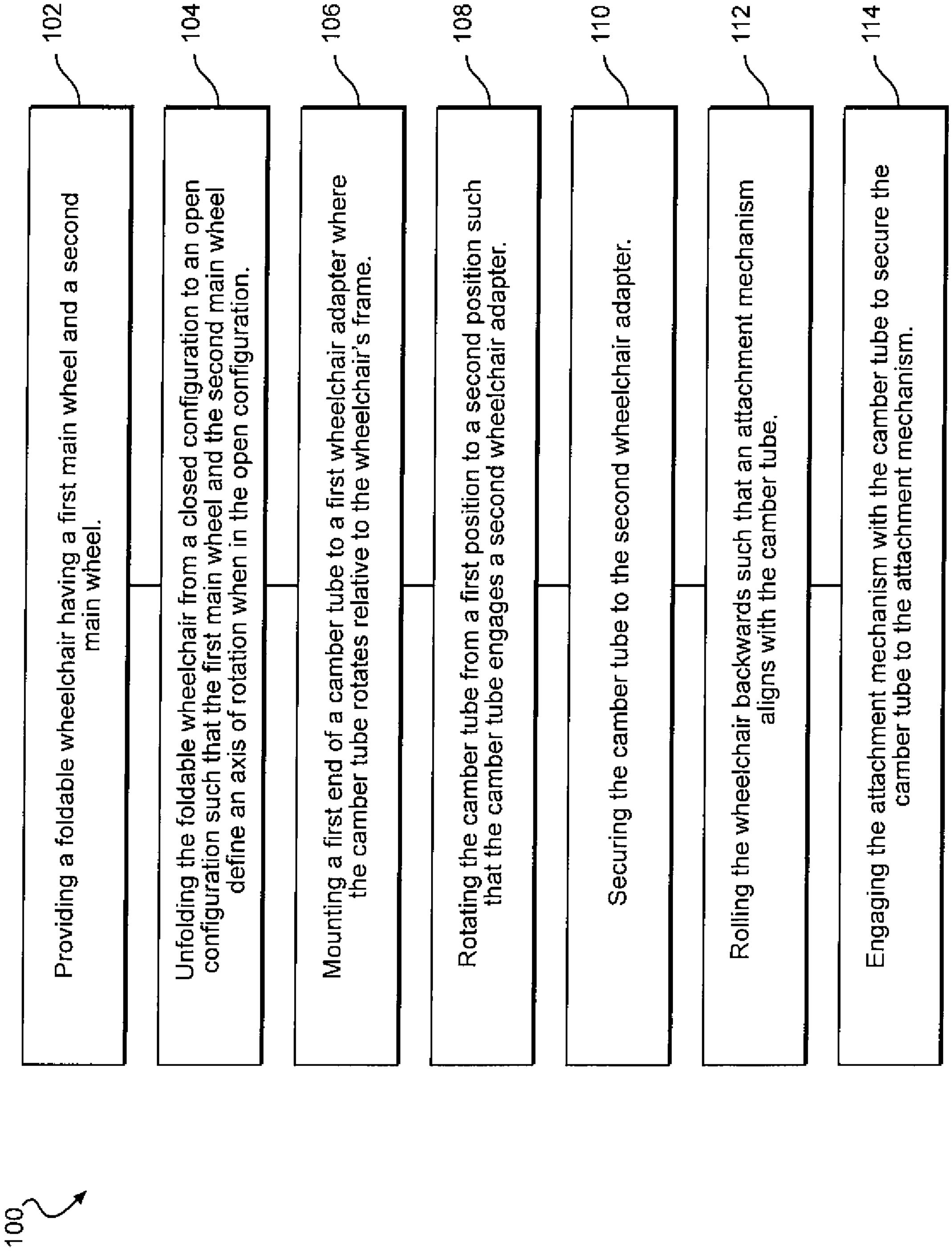
FIG. 18 is a flow chart showing the setup and installation of an external motor unit to the rotatable swing arm assembly.

Referring now to FIG. 18, a flowchart showing the operation of the rotatable swing arm assembly is shown and generally designated 100. In step 100, a foldable wheelchair is provided, where the wheelchair has a first main wheel and a second main wheel. In step 104, the wheelchair is unfolded from a closed configuration, typically used for transport and storage, to an open configuration such that the first and second main wheels define an axis of rotation when in the open configuration since the first and second main wheels are parallel to each other when in the open configuration. Next, in step 106, the first end of a camber tube is rotatably mounted to a first wheelchair adapter that is mounted to a frame member of the wheelchair's frame. The first end of the camber tube is typically mounted using a pin, however, other types of mounts that allow rotation are fully contemplated. The rotatable nature of the mount allows the camber tube to rotate from a first position, which is perpendicular to the axis of rotation, to a second position, which is parallel to the axis of rotation. As such, step 108 has the camber tube rotated from the first position to the second position where the camber tube engages a second wheelchair adapter. In step 110, the camber tube is secured to the second wheelchair adapter. The camber tube may be secured to a wheelchair adapter using any type of attachment known in the industry without departing from the scope and spirit of the invention.

To engage the attachment mechanism, such as a rotatable swing arm assembly with an external power unit, step 112 has the wheelchair rolling backwards such that an attachment mechanism aligns with the camber tube. Lastly, in step 114, an attachment mechanism, such as the external power unit's attachment mechanism, engages the camber tube, where the camber tube is able to rotate with respect to the attachment mechanism.

Figure 19:
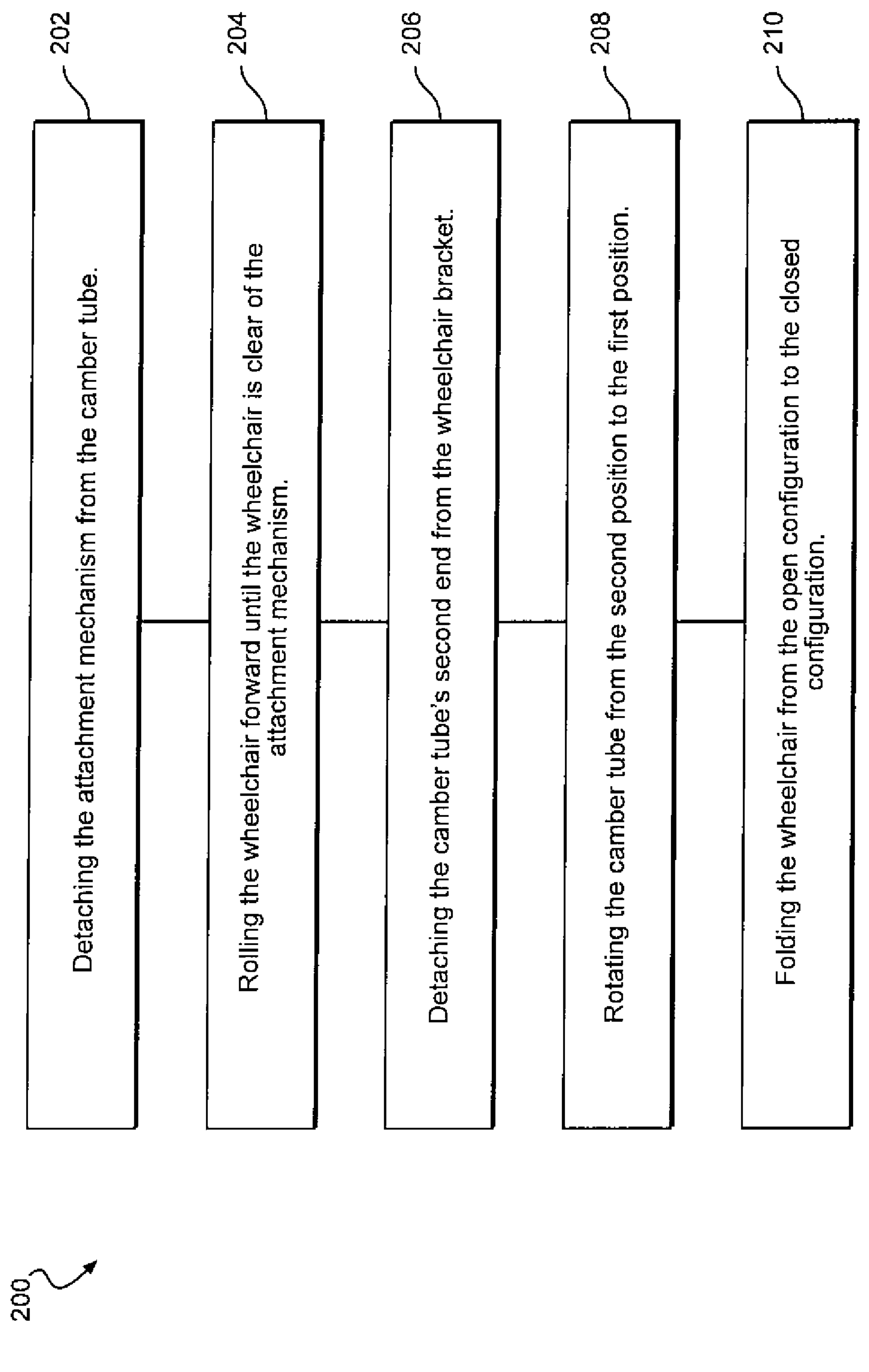
FIG. 19 is a flow chart showing the disengagement of an external motor unit from the rotatable swing arm assembly.

Referring to FIG. 19, a flow chart showing the disengagement of an external power unit from the rotatable swing arm assembly is shown and generally designated 200. Flowchart 200 starts with step 202, where an attachment mechanism, such as the clamping portion of an external power unit, is detached from the camber tube. In step 204, the wheelchair is rolled forward until the wheelchair is clear of the attachment mechanism. Next, in step 206, the camber tube's second end is detached from the wheelchair bracket. Step 208 then has the camber tube rotated from the second position to the first position. Lastly, in step 210, the wheelchair is folded from the open configuration to the closed configuration, which allows for easier transport and storage.

Other embodiments of the present invention may include a collapsible camber tube that telescopically collapses thereby removing the need to unpin the camber tube and rotate it away from the wheelchair adapter when desired to fold wheelchair 30. This collapsible feature helps a wheelchair user in that only a release mechanism is pressed allowing the camber tube to collapse when the user folds the wheelchair for storage or transport. When installed, swing arm assembly may also be used to mount a wheelchair to a vehicle for transport.

In certain embodiments, wheelchair adapters 18 and 26 may be mounted to the frame of wheelchair 39 through the use of mounting bracket 32. Other embodiments allow wheelchair adapters to be mounted to stub axles if implemented on wheelchair 30.

Another aspect of the present invention is the adaptation of a collapsible wheelchair to attach to a motor unit where the motor unit attaches to the chair in a location coaxial to the wheel axle. This provides a constant center of rotation of the wheelchair seat about the axis of the wheels regardless of whether a motor unit is connected to the wheelchair or the wheelchair is being used independently.

While there have been shown what are presently considered to be preferred embodiments of the present invention, it will be apparent to those skilled in the art that various changes and modifications can be made herein without departing from the scope and spirit of the invention.

We claim:

1. A swing arm stabilizer assembly, comprising:

a camber tube having a first end and a second end;

a first camber tube adapter attached to the first end of the camber tube;

a second camber tube adapter attached to the second end of the camber tube;

a first wheelchair adapter; and a second wheelchair adapter, wherein the first wheelchair adapter and the second wheelchair adapter are configured to be mounted on opposing mounting brackets of a wheelchair, wherein the first camber tube adapter is engageable to the first wheelchair adapter and secured in position and aligned therewith; and wherein the second camber tube adapter further comprises:

a first wheelchair adapter arm having a pinhole;

a second wheelchair adapter arm having a pinhole coaxially aligned with the pinhole of the first wheelchair adapter arm; and a slot formed between the first wheelchair adapter arm and the second wheelchair adapter arm, wherein the slot is configured to receive the second camber tube adapter when the camber tube is in a second position, and wherein the camber tube is secured in a first position by a pin received through the pinhole of the first wheelchair adapter arm and the pinhole of the second wheelchair adapter arm.

2. The swing arm stabilizer assembly of claim 1, wherein the first camber tube adapter has a pinhole and the first wheelchair adapter has a corresponding pinhole, and wherein the camber tube is secured to the first wheelchair adapter by insertion of a pin through the pinhole of the first c amber tube adapter and the pinhole of the first wheelchair adapter.

3. The swing arm stabilizer assembly of claim 2, wherein the second camber tube adapter has a pinhole and the second wheelchair adapter has a corresponding pinhole, and wherein the camber tube is secured in the first position by insertion of a pin through the pinhole of the second camber tube adapter and the pinhole of the second wheelchair adapter.

4. The swing arm stabilizer assembly of claim 3, wherein the pin is a quick release pin.

5. The swing arm stabilizer assembly of claim 3, wherein the pin is a cotter pin.

6. The swing arm stabilizer assembly of claim 1, wherein the second camber tube adapter comprises an alignment pin, and the second wheelchair adapter comprises an alignment pin slot configured to receive the alignment pin when the camber tube is in the first position.

7. The swing arm stabilizer assembly of claim 6, further comprising a clamp configured to be tightened over the second camber tube adapter and the second wheelchair adapter to secure the camber tube in the first position.

8. The swing arm stabilizer assembly of claim 7, wherein the clamp comprises a lever engageable to tighten the clamp, thereby securing the camber tube in the first position.

9. The swing arm stabilizer assembly of claim 1, wherein the first camber tube adapter and the second camber tube adapter are integral to the camber tube.

10. The swing arm stabilizer assembly of claim 1, wherein the camber tube comprises a first portion and a second portion, wherein the first portion and the second portion are threaded such that the first portion engages the second portion using the threads thereby allowing for adjustment of the camber tube's length.

11. A foldable wheelchair with a swing arm assembly, comprising:

a folding wheelchair having a first main wheel and a second main wheel defining an axis of rotation;

a camber tube having a first end and a second end;

a first camber tube adapter attached to the first end of the camber tube;

a second camber tube adapter attached to the second end of the camber tube;

a first wheelchair adapter adapted to a first frame member of the folding wheelchair; and a second wheelchair adapter adapted to a second frame member of the folding wheelchair opposite the first frame member, wherein the first camber tube adapter is removably attached to the first wheelchair adapter and the second wheelchair adapter is removably attached to the second camber tube adapter, wherein the first camber tube adapter has a pinhole and the first wheelchair adapter has a corresponding pinhole, and wherein the first camber tube adapter is attached to the first wheelchair with a pin inserted through the pinhole of the first camber tube adapter and the pinhole of the first wheelchair adapter, wherein the second wheelchair adapter further comprises:

a first wheelchair adapter arm having a pinhole;

a second wheelchair adapter arm having a pinhole coaxially aligned with the pinhole of the first wheelchair adapter arm; and a slot formed between the first wheelchair adapter arm and the second wheelchair adapter arm, wherein the slot is configured to receive the second camber tube adapter when the camber tube is in a second position, and wherein the camber tube is secured in a first position by a pin received through the pinhole of the first wheelchair adapter arm and the pinhole of the second wheelchair adapter arm.

12. The foldable wheelchair with a swing arm assembly of claim 11, wherein the pin is a quick release pin, a cotter pin, or a bolt.

13. The foldable wheelchair with a swing arm assembly of claim 11, wherein the second camber tube adapter comprises an alignment pin, and the second wheelchair adapter comprises an alignment pin slot configured to receive the alignment pin when the camber tube is in the first position.

14. The foldable wheelchair with a swing arm assembly of claim 13, further comprising a clamp configured to be tightened over the second camber tube adapter and the second wheelchair adapter to secure the camber tube in the first position.

15. The foldable wheelchair with a swing arm assembly of claim 14, wherein the clamp comprises a lever engageable to tighten the clamp, thereby securing the camber tube in the first position.

16. The foldable wheelchair with a swing arm assembly of claim 11, wherein the first camber tube adapter and the second camber tube adapter are integral to the camber tube.

17. The foldable wheelchair with a swing arm assembly of claim 11, wherein the camber tube comprises a first portion and a second portion, wherein the first portion and the second portion are threaded such that the first portion engages the second portion using the threads thereby allowing for adjustment of the camber tube's length.

* * * * *